INVENTOR.
JACQUES CAYZAC

United States Patent Office 3,560,977
Patented Feb. 2, 1971

3,560,977
AERIAL FOLLOWER DEVICE
Jacques Cayzac, Val de Marne, France, assignor to U.S. Philips Corporation, New York, N.Y., a corporation of Delaware
Filed Apr. 3, 1969, Ser. No. 813,232
Claims priority, application France, Apr. 9, 1968, 147,443
Int. Cl. G01s 1/04
U.S. Cl. 343—100          4 Claims

ABSTRACT OF THE DISCLOSURE

A transmitter has an antenna that has two sections which transmit horizontally and vertically polarized radiation with a 90 degree phase shift. A receiver has an antenna which has two sections for receiving vertically and horizontally polarized radiation. By comparing the phase of the received radiation, the transmitter antenna is pointed towards the receiver.

---

Figure 1:
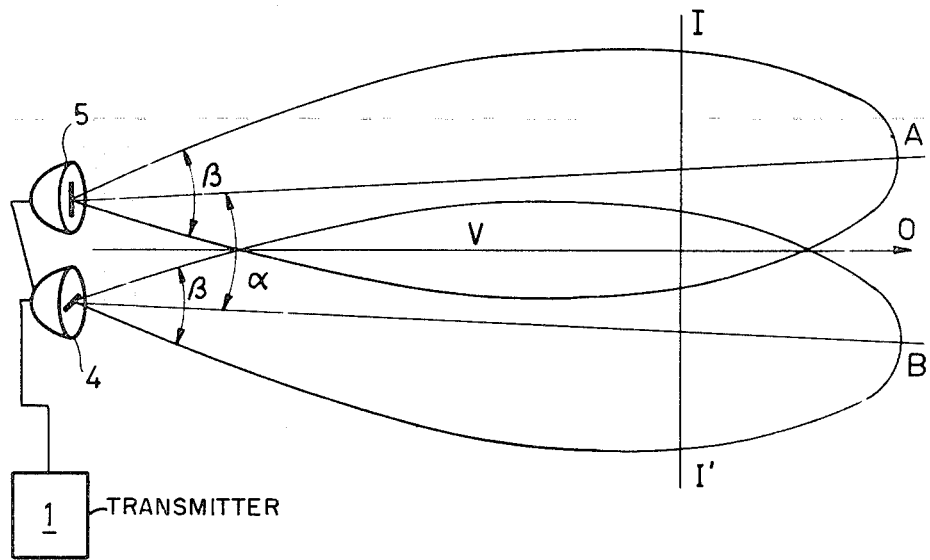

The invention relates to an aerial follower device for automatically directing a transmitter aerial to a receiver aerial, the transmitter aerial being provided with a control device and two radiators of which the axes of the main loops enclose a small angle, the receiver aerial including a detection device which is suitable for applying correction signals to the control device which correction signals are proportional to the difference between the instantaneous and the optimum transmitter aerial directions.

Such a device serves to suppress interference signals such as reflected waves by selecting the desired signals and by establishing a directed connection and may be used for a mobile transmitter and a stationary or mobile receiver station such as, for example, a television camera and a recording car.

An aerial follower device has already been proposed in which the signals to be transmitted are alternately emitted by one radiator and the other radiator of the transmitter aerial and in which a receiver aerial is used which is insensitive to directions. The intensities of the received signals are dependent on the instantaneous direction in which the transmitter aerial emits. If the transmitter aerial has such a direction that the bisectrix of the angle enclosed by the axes of the main loops is directed to the receiver aerial, both signals are received equally strong in case of equal intensity during emission. When the transmitter aerial deviates from this direction one of the signals will be received more strongly than the other so that an amplitude-modulated signal is received. After detecting and filtering the fundamental frequency (switching frequency of the transmitter aerial) the phase of this signal is compared with a reference signal, which phase, for an orientation of the transmitter aerial on one side of the receiver aerial differs 180° from an orientation of the transmitter aerial on the other side of the receiver aerial. The information thus obtained is applied for correction of the transmitter aerial device to the control unit of the transmitter aerial. This control unit will turn the transmitter aerial in such a manner that the difference in intensities of the received signals will decrease. A drawback of this device is the fact that when the transmitter aerial device deviates from the optimum direction, the signal received is amplitude-modulated in the rhythm of the switching frequency of the transmitter aerial loops. This is impermissible for many uses such as, for example, for the transmission of colour television signals.

The present invention meets this drawback because the radiators are suitable for emitting linearly polarized waves being orthogonal relative to one another, the receiver aerial consisting of two parts one of which is exclusively suitable for the reception of one of the linearly polarized waves emitted by the transmitter aerial and the other one of which is exclusively suitable for the reception of the other emitted linearly polarized wave.

Figure 2:
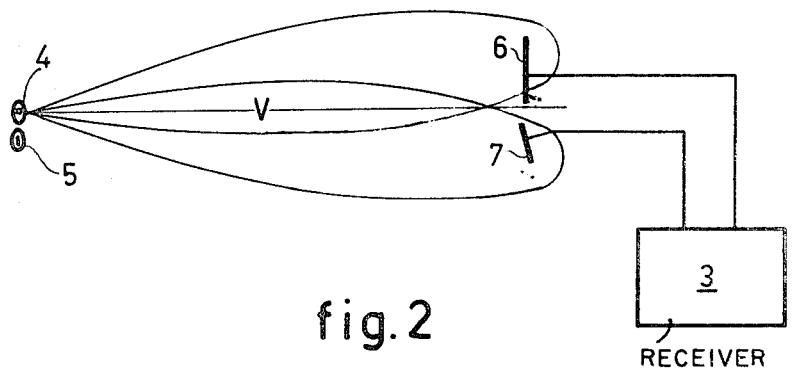
Figure 3:
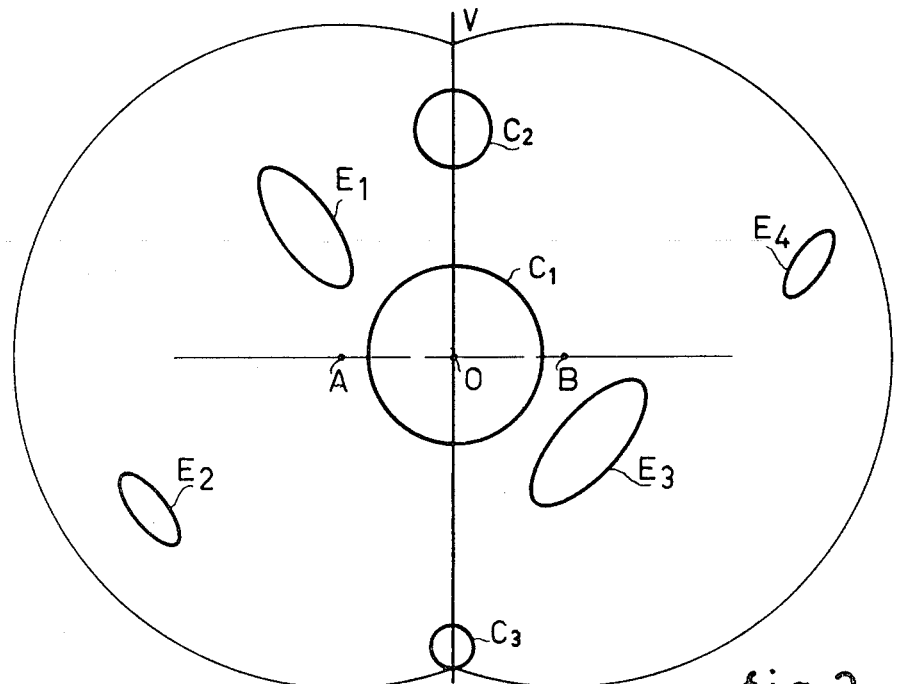
Figure 4:
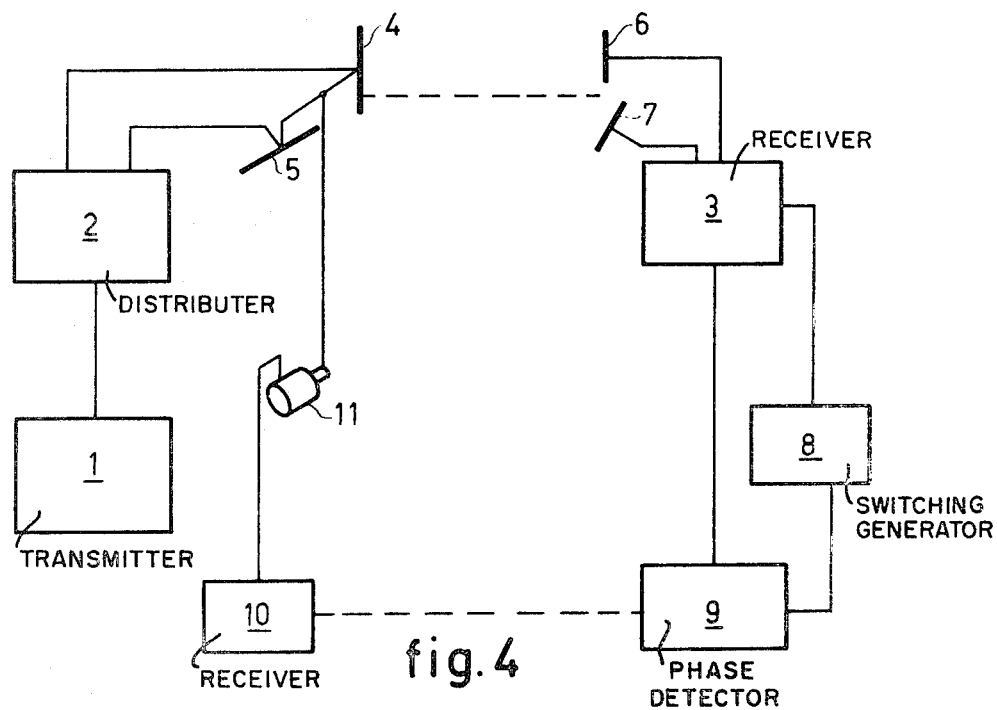

In order that the invention may be readily carried into effect, an embodiment thereof will now be described in detail by way of example with reference to the accompanying diagrammatic drawing, in which FIG. 1 shows the transmitter aerials and their radiation patterns, FIG. 2 shows the receiver aerials, FIG. 3 is a cross-sectional view of the radiation pattern of FIG. 1 taken on the line 1-1' for a preferred embodiment of the emitted phases of the transmitter aerials, FIG. 4 shows a complete device.

The energy of the transmitter 1 (FIG. 1) is applied simultaneously and to the same extent to two linearly polarized radiators 4 and 5 whose directions of polarization are at right angles. The axes A and B of the main loops of the radiators along which maximum energy is emitted mutually form an angle $\alpha$ so that the transmitter loops diverge. The choice of $\alpha$ is dependent on the extent of beaming the radiation pattern, thus on the aperture angle $\beta$ of the main loops which are preferably chosen to be equal for both radiators. In practice $\beta = \pm 30°$. Since the energy applied to the two radiators 4 and 5 of the aerial is equally large and the efficiencies of the two radiators are assumed to be equal, the field strengths of the electromagnetic field originating from each radiator will be equally great in a plane V which is at right angles to the connection lines of the radiators and in which the bisectrix of the divergence angle $\alpha$ is located. One of the two field strengths will be predominant in each point located outside this plane. This field distribution is transmitted to a receiver aerial as shown in FIG. 2. The receiver aerial consists of two parts 6 and 7 which are each exclusively suitable for the reception of linearly polarized waves, whose directions of polarization correspond to those of the transmitter aerials 4 and 5. By comparing the strengths the received signals of the aerials 6 and 7 in the receiver 3, an indication is obtained about the location of the plane V relative to the receiver. If this system is used for a transmitter and a receiver station of which only an orientation is required in a horizontal plane relative to each other, the said plane V is chosen to be vertical. This means that the radiators at the transmitter end and those of the receiver aerials are located in a horizontal plane. This device makes is possible that the desired signal to be transmitted is simultaneously used for directing the transmitter aerial to the receiver aerial without using a switching frequency at the transmitter end. At the receiver end the signals received by the aerials 6 and 7 can be used for gaining both the signal information transmitted and for gaining information regarding the transmitter aerial device. It is, however, alternatively possible to gain the signal information from a third aerial at the receiver end, which has its position in the same direction as that of the aerials 6 and 7 and which is insensitive to a direction of polarisation so that it can utilize the overall transmitted power, but which may be very sensitive to directions and thus ensures a transmission free from interference such as, for example, a helical aerial. To this end, the waves transmitted by the radiators 4 and 5 are preferably transmitted at a mutual phase difference of 90°. FIG. 3 shows the field image associated therewith for a horizontally and vertically polarized field at the cross-section 1-1' of the transmitter loops shown in FIG. 1. At the plane V a circularly polarized field is obtained which is indicated by the circles $C_1$, $C_2$ and $C_3$ in FIG. 3. On the side of the plane V where the axis A is located, for example, the vertically polarized field is predominant relative to the horizontally polarized field which results in an elliptic polarisation with an oblique position of the large axis of more than 90° relative to the line going through A and B (ellipses $E_1$ and $E_2$), and on the other side of the plane V, hence where the horizontally polarized field is predominant relative to the vertically polarized field this results in an elliptic polarisation of which the large axis forms an angle with the line A–B which is smaller than 90° (ellipses $E_3$ and $E_4$). The receiver aerial (not shown) for the information signal is in this case preferably a helix. The information for determinring the direction of the transmitter aerial which is obtained from the receiver aerials 6 and 7 may be processed in different manners such as, for example, by continuously comparing the two signal intensities. The device shown in the embodiment 4 operates differently, however.

The signal applied to the transmitter 1, for example, originating from a television camera not shown is used to modulate the carrier frequency. This frequency-modulated signal is applied to a distributor 2 which supplies the radiators 4 and 5 with equal powers. These radiators are, for example, incorporated in a reflector. The fields emitted by the radiators 4 and 5 are linearly polarized, they are at right angles and are 90° shifted in phase and have a radiation diagram as is shown in FIG. 1. The signals received by the linearly polarized receiver aerials 6 and 7 are alternately connected to the receiver 3 by means of a switching signal originating from generator 8. In television signals the commutation period is preferably chosen to be equal to the line period because it may be expected that the average power does not vary very much from line to line. The signals are applied after detection in the receiver 3 to a phase detector 9 to which also a reference voltage is applied which is controlled by the switching generator 8. This phase comparator supplies a continuous voltage whose amplitude is proportional to the deviation of the position of the transmitter aerial relative to the position of the aerial at which maximum (circularly polarized) reception occurs, and whose sense is determined by the side of the optimum position of the transmitter aerial where the instantaneous position of the transmitter aerial is present. The comparator 9 emits this information in a digital form to a receiver 10 at the transmitter end through an auxiliary connection (broken line between 9 and 10) in order to protect this connection from noise. This receiver 10 controls the motor 11 which rotates the transmitter aerial with the radiators 4 and 5 towards the optimum position of the aerial.

It has been found from tests that rotation of the directions of polarisation of the waves for the carrier frequencies used, being 1.5 gHz., substantially does not occur and that also in case of reflection the direction of polarisation is maintained. The decoupling measured between the two receiver aerials was in fact more than 20 db.

What is claimed is:

1. An aerial follower device for automatically directing a transmitter aerial to a receiver aerial, the transmitter aerial being provided with a control device and two radiators of which the axes of the main loops enclose a small angle, the receiver aerial including a detection device which is suitable for applying correction signals to the control device which correction signals are proportional to the difference between the instantaneous and the optimum transmitter aerial directions, characterized in that the radiators are suitable for emitting linearly polarized waves being orthogonal relative to one another, the receiver aerial consisting of two parts one of which is exclusively suitable for the reception of one of the linearly polarized waves emitted by the transmitter aerial and the other one of which is exclusively suitable for the reception of the other emitted linearly polarized wave.

2. An aerial follower device as claimed in claim 1, characterized in that the receiver includes a generator and a switch which, under the control of a switching signal originating from the generator alternately connects the two parts of the receiver aerial to the detection device and that a comparator is provided which compares the detected signal with a second signal supplied by the generator for determining the amplitude and sense of the correction signal.

3. An aerial follower device as claimed in claim 1 further comprising means for phase shifting the fields emitted by the radiators by 90° in phase with respect to each other coupled to said transmitter aerial and an additional receiver helix aerial is provided at said receiver.

4. An aerial follower device as claimed in claim 3, characterized in that the comparator supplies a digitized correction signal.

References Cited

UNITED STATES PATENTS

| | | | |
|---|---|---|---|
| 2,257,319 | 9/1941 | Williams | 343—100(CS) |
| 3,088,697 | 5/1963 | Cutler | 343—100(.3) |
| 3,353,182 | 11/1967 | Hart. | |

RICHARD A. FARLEY, Primary Examiner

R. E. BERGER, Assistant Examiner

U.S. Cl. X.R.
325—64; 343—102